US008248393B2

(12) United States Patent
Hekstra et al.

(10) Patent No.: US 8,248,393 B2
(45) Date of Patent: Aug. 21, 2012

(54) SPECTRUM SEQUENTIAL DISPLAY HAVING REDUCED CROSS TALK

(75) Inventors: Gerben Johan Hekstra, Eindhoven (NL); Nalliah Raman, Singapore (SG); Claus Nico Cordes, Eindhoven (NL); Martin Jacobus Johan Jak, Eindhoven (NL); Jurgen Jean Louis Hoppenbrouwers, Eindhoven (NL); Oleg Belik, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 1306 days.

(21) Appl. No.: 11/914,966

(22) PCT Filed: May 9, 2006

(86) PCT No.: PCT/IB2006/051455

§ 371 (c)(1), (2), (4) Date: Nov. 20, 2007

(87) PCT Pub. No.: WO2006/126118

PCT Pub. Date: Nov. 30, 2006

(65) Prior Publication Data

US 2008/0211973 A1 Sep. 4, 2008

(30) Foreign Application Priority Data

May 23, 2005 (EP) .................................... 05104361
Aug. 17, 2005 (EP) .................................... 05107580

(51) Int. Cl.
*H04N 9/31* (2006.01)
*G02B 27/09* (2006.01)
*G09G 3/20* (2006.01)

(52) U.S. Cl. ....................................... 345/204; 345/690

(58) Field of Classification Search .................. 345/204, 345/690
See application file for complete search history.

(56) References Cited

U.S. PATENT DOCUMENTS

2002/0057253 A1 5/2002 Lim et al.
2004/0263500 A1* 12/2004 Sakata .......................... 345/204
2005/0057444 A1 3/2005 Ko

FOREIGN PATENT DOCUMENTS

GB 2343980 A 6/2000
WO WO2004032523 A1 4/2004
WO WO 2004032523 A1 * 4/2004

* cited by examiner

*Primary Examiner* — Amare Mengistu
*Assistant Examiner* — Jennifer Zubajlo
(74) *Attorney, Agent, or Firm* — Shimokaji & Assoc., PC

(57) ABSTRACT

A color display device, a drive circuit for a color display device, a method, a signal and a computer-readable medium for reducing electro-optical cross talk that occurs in a display that is operated in Spectrum Sequential mode is disclosed. The invention eliminates annoying visible artifacts, such as contouring, noise, or color deviation, which normally are introduced by this cross talk by compensating for the cross talk. According to embodiments of the invention, a drive signal (R',G',B') to drive picture elements of the display is altered in video processing circuitry (MPC, XTC, SC) and/or software, in dependence on one or more properties of different spectra from a light source (23, 24) in the display. The invention is implemented with little extra effort and cost in known LCD displays.

19 Claims, 9 Drawing Sheets

SPECTRUM SEQUENTIAL DISPLAY HAVING REDUCED CROSS TALK

FIELD OF THE INVENTION

This invention pertains in general to the field of color display devices and methods of operating such devices. More particularly the invention relates to wide color gamut color displays and even more particularly to Spectrum Sequential Displays and a method for reducing electro-optical cross talk in such displays.

BACKGROUND OF THE INVENTION

Color display devices are well known and are used in, for example, televisions, monitors, laptop computers, mobile phones, personal digital assistants (PDA's) and electronic books.

A wide color gamut color display device is described in WO2004/032523 of same applicant, which herewith is incorporated by reference. The color display device displays a color image with a wide color gamut and is provided with a plurality of picture elements, two selectable light sources having different predetermined radiance spectra, color selection means which in combination with the selectable light sources are able to produce respective first and second primary colors on the display panel and control means arranged to select alternately one of the selectable light sources and to provide a portion of the picture elements with image information corresponding to the respective primary colors obtainable with the selected light source. The primary colors of the display device can be selected in a time sequential and space sequential way which enable a reduction of a color break-up.

The device is of the type that is also called Spectrum Sequential Display and is an in-between form of a regular, for instance an RGB, display and a color sequential display, which also is called Field Sequential Display. The display primaries are formed spatio-temporally, using both multiple color filters, and multiple (spectral) light sources, which are alternately flashed in a number of sub-frames.

The color gamut of such a display is very much larger than what can be realized with a conventional display and conventional 3-phosphor mix fluorescent lamp, while it gives comparable brightness.

In an ideal Spectrum Sequential Display, as disclosed in WO2004/032523, there is theoretically no interaction between two sub-frames. However, in a real life Spectrum Sequential Display, electro-optical cross talk occurs. This is caused by a number of effects, such as:

1. The slow temporal electro-optical LC response of the LCD panel. The abbreviation LC stands for Liquid Crystal, the abbreviation LCD for Liquid Crystal Display.
2. The temporal lamp profile, which in turn is determined by:
a. The phosphor decay time of the individual phosphors;
b. The spatio-temporal optical cross talk in the backlight if operated in lamp scanning mode; and
c. The specific lamp timing, relative to the display addressing.

This electro-optical cross talk causes that the display primaries are not as saturated as intended. It in turn causes a shift in the intended color. This may be particularly annoying in a multi-primary display, where freedom in the six primaries allows for different combinations of drive values to result in the same, uniform, intended color. Under influence of the cross talk, these different drive levels can result in differing shifts in color, which results in very visible and annoying contouring and noise artifacts.

In addition, this cross talk also increases in severity for higher frame rates, which are essential for proper operation of Spectrum Sequential Displays that are not allowed to have visible flicker. For instance for a 60 Hz Spectrum Sequential television set (TV), a 120 Hz sub-frame rate has to be applied when using two sub-frames, and for a 50 Hz TV it is desired to apply a 150 Hz sub-frame rate, possibly aided by an up-conversion to a 75 Hz frame-rate to ensure a flicker-less Spectrum Sequential TV.

The temporal waveform of the lamp response of a Spectrum Sequential Display is also a cause for electro-optical cross talk.

This cross talk could be reduced, albeit eliminated, when we apply:

1. A very fast LC response panel (OCB or the like)
2. A flashing lamp scheme, rather than scanning, which also implies fast addressing and settling of LC.
3. Very fast response phosphors, or LED/laser based light sources.

However, these measures add considerable cost and complexity to the Spectrum Sequential Display system, and incur reduced efficiency. Therefore, it is contemplated that, at least for the time being, there will always be a cross talk component in a commercially viable Spectrum Sequential Display.

Hence, it is desired to provide an advantageous way of reducing electro-optical cross talk in a wide gamut Spectrum Sequential Display, allowing for increased flexibility, and cost-effectiveness without substantially increasing power consumption of the display, while still maintaining comparable brightness levels.

SUMMARY OF THE INVENTION

Accordingly, the present invention preferably seeks to mitigate, alleviate or eliminate one or more of the above-identified deficiencies in the art and disadvantages singly or in any combination and solves at least one of the above mentioned problems, at least partly, by providing a color display device, a circuit for driving a panel of a color display device, a method, a signal and a computer-readable medium according to the appended claims.

The invention is defined by the independent claims. The dependant claims define advantageous embodiments.

The general solution according to the invention is providing a reduced electro-optical cross talk in a Spectrum Sequential Display. This is mainly achieved by compensating for the cross talk effects in an advantageous way.

The one or more properties of the light source may be related to the first and/or the second spectrum, for example, color or intensity, but may also be related to timing related aspects. For example: rise and/or fall time of the intensity of these spectra, the timing of these spectra with respect to the timing of the drive signal, and/or with respect to the response of the LC to this drive signal, thereby taking into account the response characteristics of the LC material.

BRIEF DESCRIPTION OF THE DRAWINGS

These and other aspects, features and advantages of which the invention is capable of will be apparent from and elucidated by the following description of embodiments of the present invention, reference being made to the accompanying drawings, in which.

DESCRIPTION OF EMBODIMENTS

Figure 1:
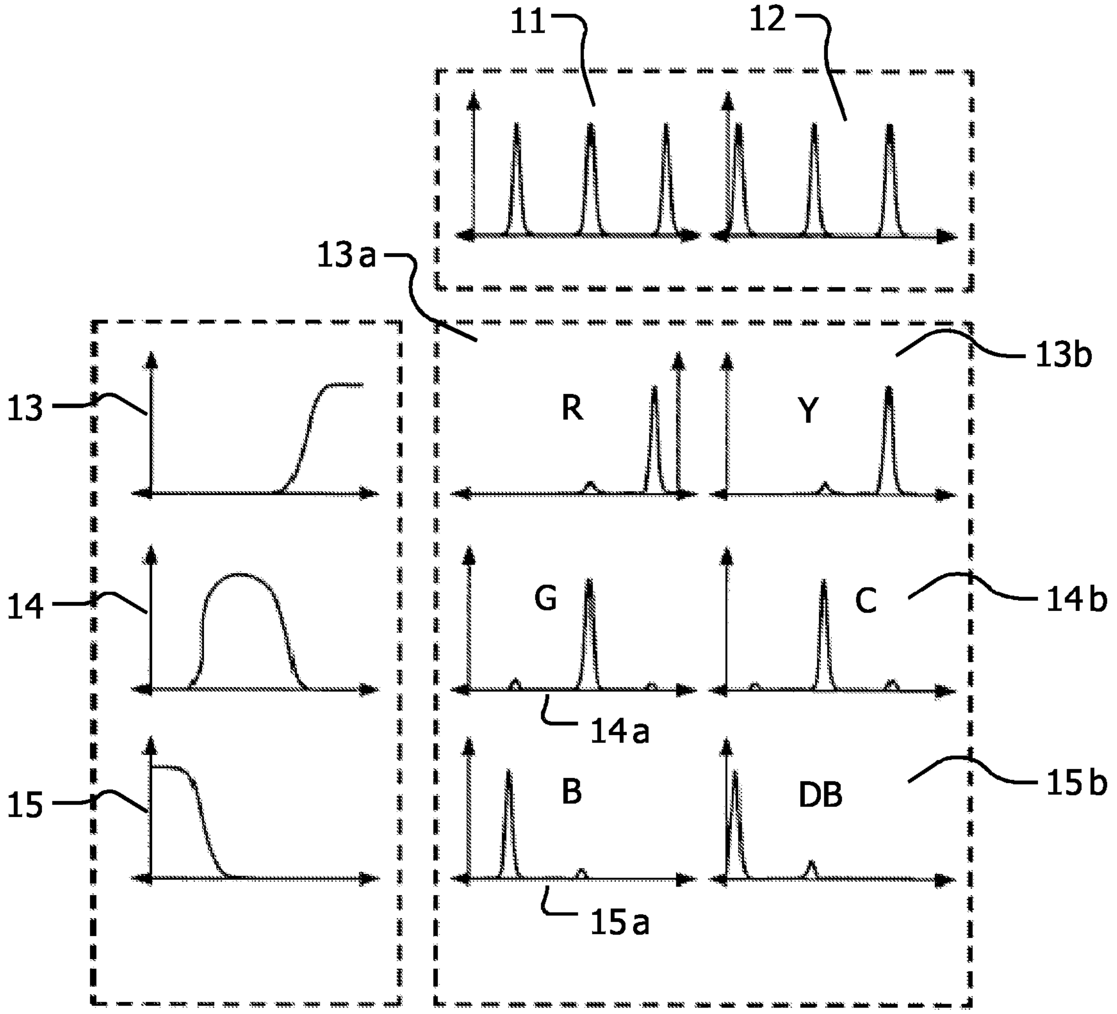
FIG. 1 is a schematic illustration of the basic principle of a spectrum sequential LCD.

The following description focuses on an embodiment of the present invention applicable to an exemplary Spectrum Sequential Display. However, it will be appreciated that the invention is not limited to this application but may be applied to many other Spectrum Sequential Displays.

It will be understood that the Figs. are merely schematic and are not drawn to scale. For clarity of illustration, certain dimensions may have been exaggerated while other dimensions may have been reduced. Also, where appropriate, the same reference numerals and letters are used throughout the Figs. to indicate the same parts and dimensions.

Generally, a liquid crystal display (also called LCD) device includes two substrates and an interposed liquid crystal layer. The two substrates have opposing electrodes such that an electric field applied across those electrodes causes the molecules of the liquid crystal (also called LC) to align according to the electric field. By controlling the electric field a liquid crystal display device can produce an image by varying the transmittance of incident light, usually from a backlight light source of a fixed spectrum. The electric field is generally implemented by supplying a drive signal to picture elements of a LCD in order to control said transmittance.

As mentioned above, a Spectrum Sequential Display is an in-between form of a regular, for instance an RGB, display and a color sequential display, which also is called Field Sequential Display. The display primaries in a color sequential display are formed spatio-temporally, using both multiple color filters, and multiple (spectral) light sources, which are alternately flashed in a number of sub-frames. The below described embodiments of a spectrum sequential display comprise exemplary a light source being formed by two separate light sources to generate two different spectra for illuminating picture elements of a LC display. However, this light source may also be a "single" light source of which light is for instance modulated resulting in two different spectra at different points in time. Basically any light source capable of producing selectable light spectra described herein is suitable for this purpose.

For example, the inventors have demonstrated (not published) a six primary display, based on a direct view LCD panel with three color filters (regular RGB) and equipped with two types of fluorescent light sources, which differ spectrally. In a first sub-frame, the first type of these light sources is applied which, in combination with the RGB color filters, delivers the first set of three primaries. In a second sub-frame, subsequent to the first sub-frame, the second type of the light sources is applied which, again in combination with the same RGB color filters, delivers the second set of three primaries. This principle is also illustrated with reference to FIG. 1.

FIG. 1 discloses a first spectrum from an ordinary fluorescent light source 11 and a spectrum from a second fluorescent light source 12, which has a different spectrum. To the left are shown three color filters 13, 14, 15 of regular RGB type. In the middle of FIG. 1 there is disclosed the response 13*a*, 13*b*, 14*a*, 14*b*, 15*a*, 15*b* of each of the filters 13, 14, 15 to the two light sources 11, 12 indicated right above. As is evident from FIG. 1, the red color filter 13 passes the red light from light source 11, indicated by R in response 13*a*, and the yellow light from the second light source, indicated by Y in response 13*b*. The green color filter 14 passes the green light from light source 11, indicated by G in response 14*a*, and the cyan light from the second light source, indicated by C in response 14B. The blue color filter 15 passes the blue light from light source 11, indicated by B in response 15*a*, and the deep blue light from the second light source, indicated by DB in response 15*b*.

Applying a first set of drive values to the RGB sub-pixels in the first sub-frame and a second set of drive values to the RGB sub-pixels in the second sub-frame makes a color. This is in essence a six-primary display system. By alternating the sub-frames at a high enough rate (e.g. a 120 Hz sub-frame rate for a 60 Hz display), a desired color is made, without visible flicker, and limited break-up.

Figure 2:
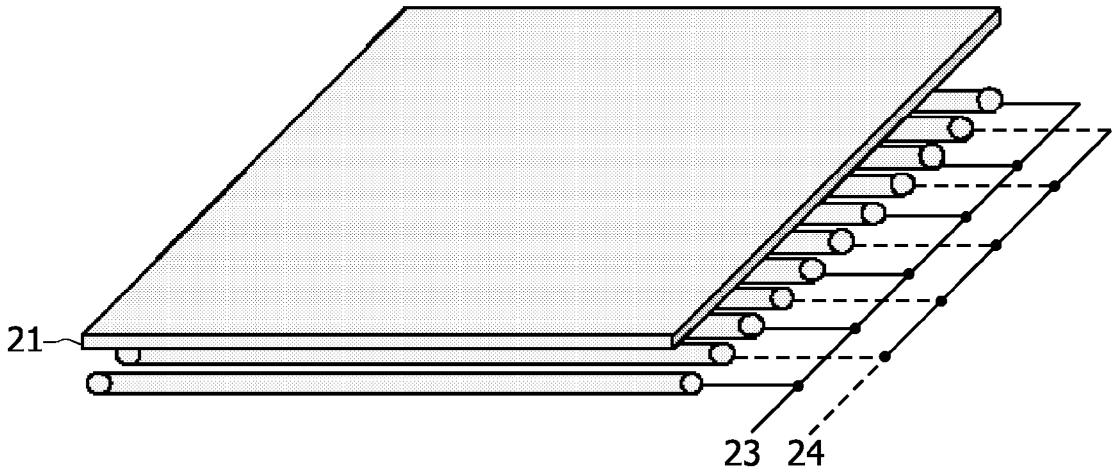
FIG. 2 is a schematic illustration of alternating lamp sets for an exemplary spectrum sequential display.

The sets of lamps 23, 24 of the exemplary Spectrum Sequential Display may be spatially alternated in the backlight as shown in FIG. 2, in order to give the best possible uniformity for each lamp set. The lamps are operated in a scanning mode, with first the lamp set 23 being operated during the first sub-frame and then the second set 24 during the second sub-frame, in synchronization with the sub-frame addressing of the LC panel 21. A backlight where the lamps are operated in a scanning mode is also known as a scanning backlight. As mentioned above, other embodiments may use different arrangements of different types of light sources, also different number of light sources, including a single light source capable of modulating different spectra.

Figure 3A:
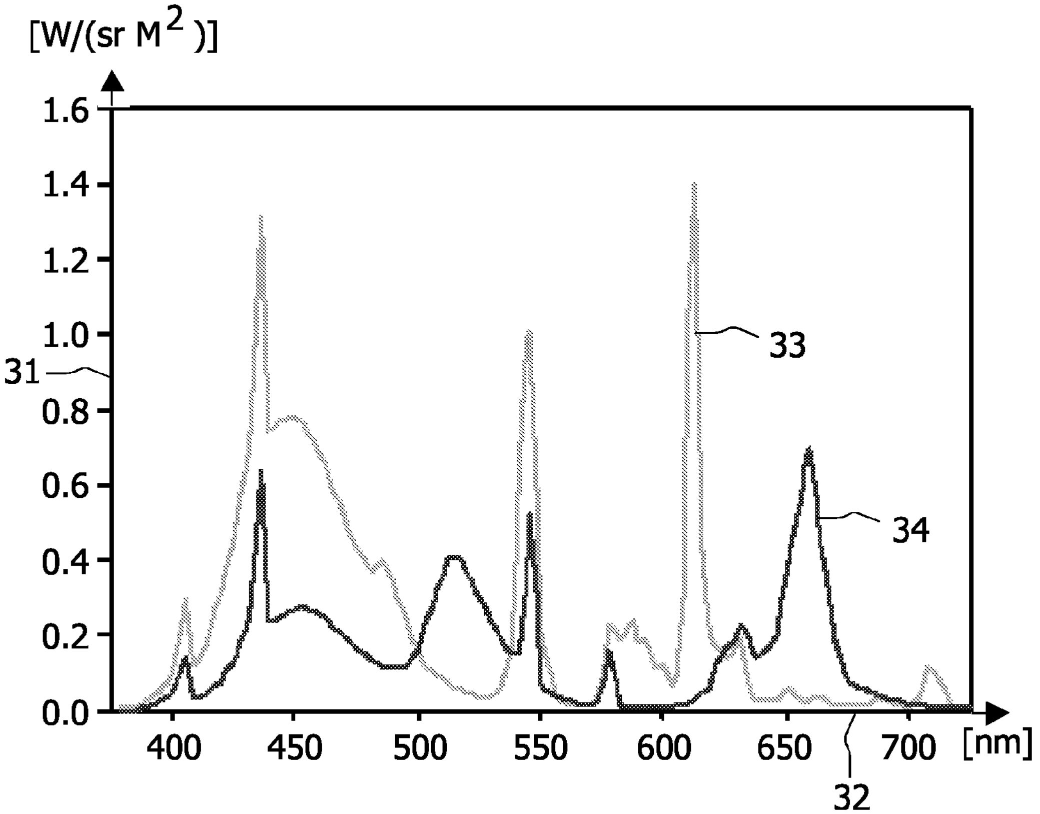
FIGS. 3A and 3B are illustrations showing lamp spectra and color triangles of an exemplary spectrum sequential display, wherein a first lamp contains the standard red, green and blue phosphors and a second lamp contains other phosphors replacing the standard red and green phosphors.
Figure 3B:
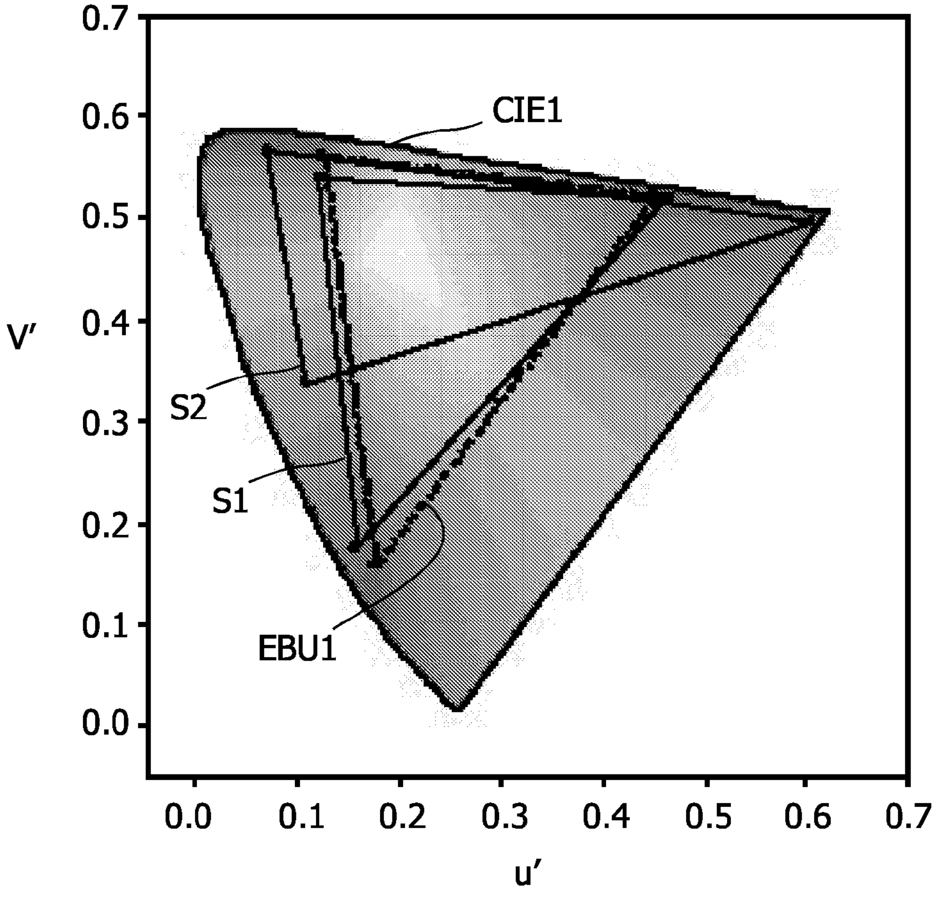

The color gamut of such a display is very much larger than what can be realized with a conventional display and conventional 3-phosphor mix fluorescent lamp, while it gives comparable brightness. An exemplary implemented system built by the inventors uses the lamp spectra 33 and 34 as shown in FIG. 3*a*, which illustrates the Spectral Radiance [watt/sr $m^2$] 31 as a function of wavelength [nm] 32, resulting in a gamut which is spanned by the convex hull of the individual spectra S1, S2 shown in FIG. 3B, which illustrates a CIE 1976 diagram including CIE locus CIE1 and EBU spectrum EBU1. This gamut amounts to almost 160% of the color gamut when using a conventional reference lamp. This is the theoretical limit to which the color gamut can be extended. This limit is achievable with an ideal response of the LC panel and the lamps.

Figure 4:
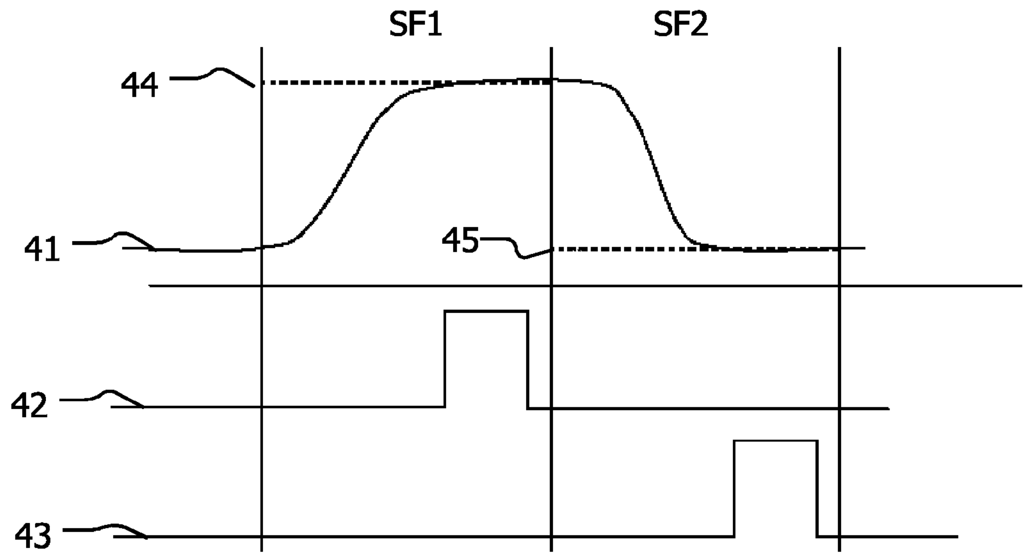
FIG. 4 is an illustration of ideal electro-optical responses in a spectrum sequential display.

In an ideal Spectrum Sequential Display, there is theoretically no interaction between the two sub-frames. FIG. 4. shows waveforms of the optical response 41 of a RGB-sub-pixel formed by a LC-cell to drive values during a first sub-frame SF1 and a second subframe SF2. During the first subframe SF1 the optical response to a drive value reaches quickly the desired level 44. When this level is reached, the first light source illuminates during a short period the LC-cell, as illustrated by the pulse 42. This light source is completely extinguished by the time that the LC cell is driven with the second drive value, corresponding to desired level 45. When the second drive value is applied to the LC-cell, this invokes also a fast optical response in the LC cell. When its desired value 45 is reached, the second light source illuminates during a short period the LC-cell as illustrated by the pulse 43.

However, in a real life Spectrum Sequential Display, electro-optical cross talk occurs. This is caused by a number of effects, which may or not may be present in the display, depending on the configuration:

1. The slow temporal electro-optical LC response of the LCD panel
2. The temporal lamp profile, which in turn is determined by:
a. The phosphor decay time of the individual phosphors
b. The spatio-temporal optical cross talk in the backlight if operated in lamp scanning mode.
c. The specific lamp timing, relative to the display addressing.

This electro-optical cross talk effect causes, for instance, that the display primaries are not as saturated as intended. This in turn causes an unintended and disadvantageous shift in the intended color. This may be particularly annoying in a multi-primary display, where freedom in the six primaries allows for different combinations of drive values to result in the same, uniform, intended color. Under influence of the cross talk, these different drive levels can result in differing shifts in color, which results in very visible and annoying contouring and noise artefacts. It is an object of the invention to reduce, minimize, optimize or eliminate such disadvantageous effects singly or in any combination.

Figure 5A:
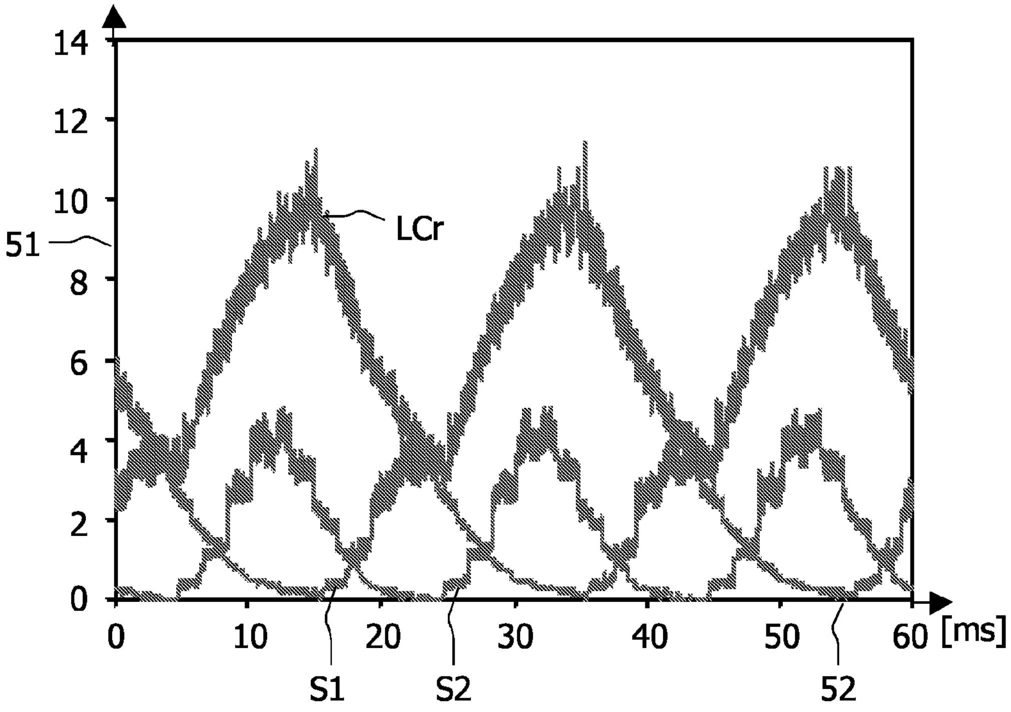
FIGS. 5A and 5B are illustrations of the response and backlight output as a function of time, as well as the color points in spectrum sequential operation.

FIG. 5A shows the superimposed time waveforms of the measured LC response LCr of the panel, the first lamp set S1, in scanning mode, and the second lamp set S2, in scanning mode. The panel is addressed to have no transmission (corresponding for example to drive level 000) in the first subframe, and full transmission (corresponding for example to drive level 255) in the second sub-frame. One can clearly see that the waveforms are far from ideal. Due to the fact that the LC has not stabilized yet, light from the first lamp spectrum is still passing through the display, even when it was not intended, leading to undesired cross talk.

Figure 5B:
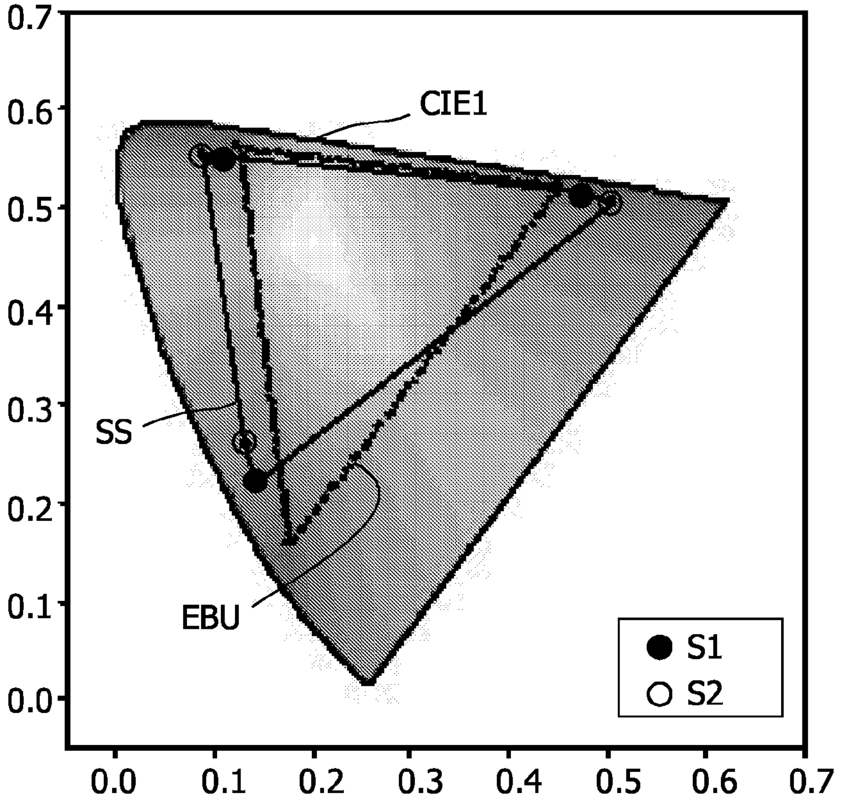

This causes, among others, desaturation of the primaries, due to spectral mixing, resulting in a greatly decreased gamut shown in FIG. 5B, which illustrates a CIE1976 diagram including CIE locus CIE1, EBU spectrum EBU1, first lamp spectrum S1, second lamp spectrum S2 and spectrum sequential SS.

In addition, this cross talk also increases in severity for higher frame rates, which are essential for proper operation of Spectrum Sequential Displays that are not allowed to have visible flicker. For instance for a 60 Hz Spectrum Sequential television set also called TV, a 120 Hz sub-frame rate has to be applied when using two sub-frames, and for a 50 Hz TV it is desired to apply a 150 Hz sub-frame rate, possibly aided by an up-conversion to a 75 Hz frame-rate to ensure a flicker-less Spectrum Sequential TV.

Figure 6:
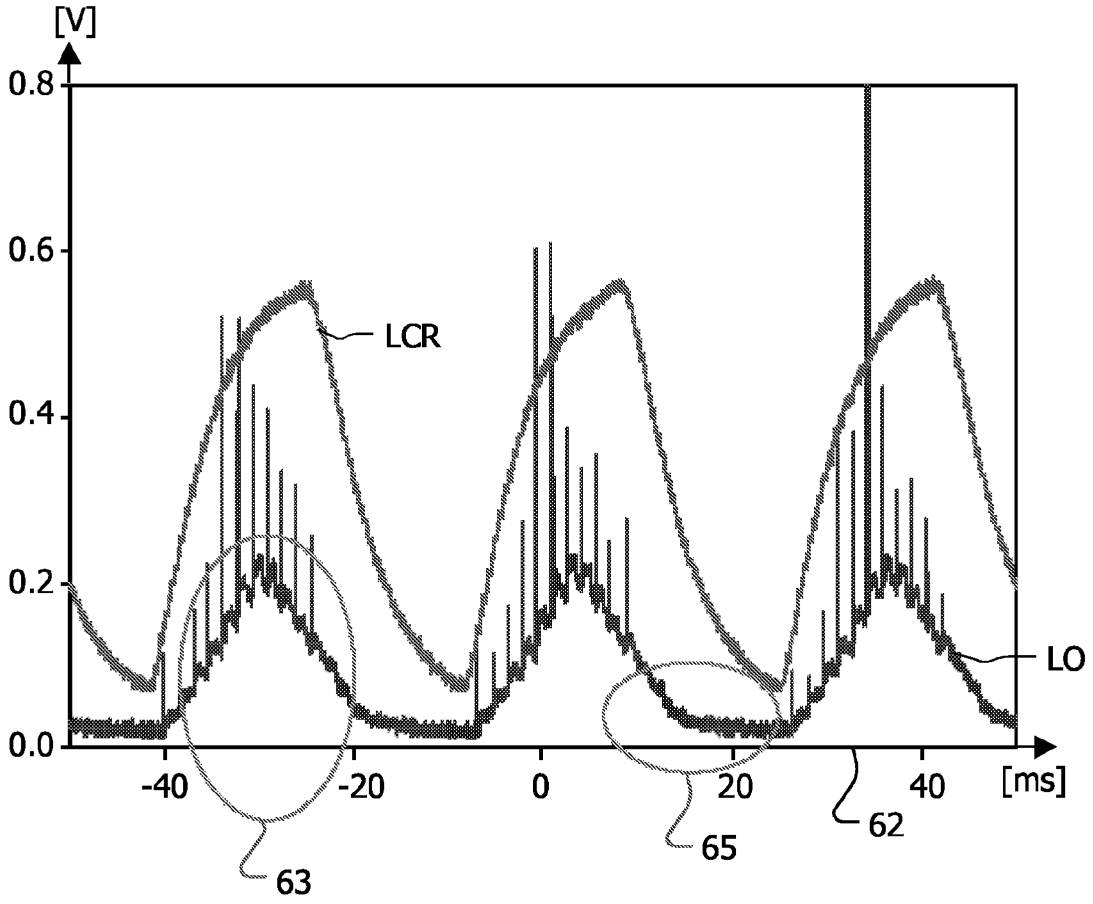
FIG. 6 is an illustration showing detailed waveforms of the LC and lamp response.

The temporal waveform of the lamp response of a Spectrum Sequential Display is also a cause for electro-optical cross talk. FIG. 6 shows the measured lamp response green LO of the above-mentioned system, as function of time as indicated by a scale 62 in ms as implemented by the inventors, in more detail, wherein only one of the lamp sets is shown. With FIG. 6 as guideline, it can be seen that the factors, which determine the amount of cross talk caused by the lamp profile, comprise:

1. Time offset of the lamps, relative to the panel addressing indicated by the LC-cell response LCr. This offset is normally chosen to maximize the total light throughput, but placing it too close to the apex of the waveforms, so during change in addressing, gives overlap in the next sub frame.
2. Width of the entire lamp profile due to scanning with non-perfect segmentation as indicated with area 63 in FIG. 6. When scanning with non perfect separation (segmentation), the light output of the adjacent lamps is visible, leading to a wide staircase waveform. Ways to reduce this width are faster addressing and of panel, and consequent faster scanning or flashing of the backlight, but this places extreme constraints on panel addressing technology and instantaneous light generation.
3. A trailing tail on the lamp waveform, due to the decay time of the phosphor as indicated with area 65 in FIG. 6. This is different per phosphor type. Typical measurements for the reference lamp phosphors indicate microsecond response for the blue phosphor, ~1.8 ms decay for the red phosphor, and even 2.4 ms decay for the green phosphor. This is significant when we have a sub frame time of 6.6 ms at 150 Hz.

As mentioned above, such cross talk may be reduced, or eliminated, when we apply:

1. A very fast LC response panel (OCB or the like)
2. A flashing lamp scheme, rather than scanning, which also implies fast addressing and settling of LC.
3. Very fast response phosphors, or LED/laser based light sources.

However, these measures add considerable cost and complexity to the Spectrum Sequential Display system, and incur reduced efficiency. Therefore, it is contemplated that, at least for the time being, there will always be a cross talk component in a commercially viable Spectrum Sequential Display.

In an embodiment of the invention, which will now be described in more detail, the effect of this electro-optical cross talk is reduced by compensation. More specifically, a drive signal to picture elements of an LC display is altered depending on the severity of cross talk effects in the display.

First, a method to measure the cross talk in a spectrum sequential display is provided. The measurement method provides a way of determining the cross talk existing in a display. More precisely, the display is alternatively driven with drive D'1 in the first sub frame and D'2 in the second sub frame. These are the actual drive values to the panel. Then the lamp circuitry is driven such that only the first lamp set is driven in the first sub frame, and no light in the second sub frame. Then D"1 as the actual light output of that sub frame is measured, as a function of (D'1, D'2). In a system without cross talk, the light output is independent of the previous drive value, in this case independent of D'2. In reality, there is less light output if D'2<D'1, and excess light for D'2>D'1. A similar measurement is done for D"2, where the second lamp set is driven in the second sub frame, and no light in the first sub frame. This is performed for at least a subset of all possible combinations of D'1, D'2.

Such measurement of cross talk was performed by the inventors for the exemplary display, and resulted in a cross talk value of ~50%; which means that around half of the light of the first spectrum mixes with the second spectrum, and vice versa. This does seriously degrade the saturation of the primaries. Calculations with a cross talk model show that this can be reduced to ⅕th, but only with a very fast panel (~4 ms response). Further reduction is then possible by better optical segmentation of the lamps, and with a shorter scanning period, or by flashing the backlight with all lamps simultaneously. However, both techniques put large demands on panel performance and add considerable cost to the display.

The above measurements yield two tables, for which an inverse is determined, so that compensation of the cross talk is possible. For the static case, see further embodiments below, a combination of (D'1, D'2) is looked for, which results, with cross talk, in the desired light outputs (D1, D2), i.e. cross talk is compensated for. This is for instance done by simultaneously searching both tables for the best drive pair (D'1, D'2) that minimizes $[(D''1-D1)^2+(D''2,-D2)^2]$, i.e. that minimizes the distance to the desired light output.

For the dynamic cases, the inverse may be calculated similarly as for known overdrive calculations, both direct and feedback versions.

Figure 11:
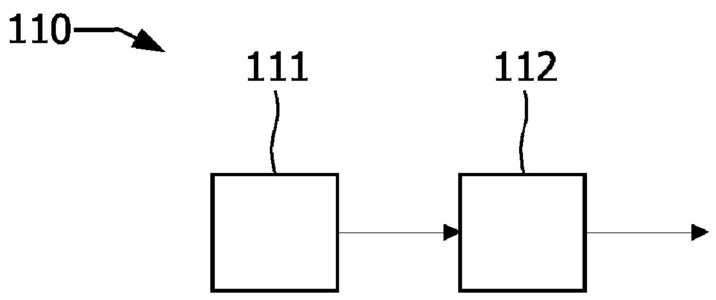
FIG. 11 is a schematic illustration of an embodiment of the method according to the present invention.

An embodiment 110 of the method according to the invention is shown in FIG. 11, comprising a step 112 of compensating cross talk in a display by finding an inverse to a cross talk of said display previously measured in step 111. More precisely, a drive signal is altered in step 112, in a video processing means, such as a circuit or a processor for processing video data to a plurality of picture elements of a display panel in a color LC display, in dependence on parameters of spectra of a light source of said color LC display. An embodiment of such a LC display is described below.

Figure 12:
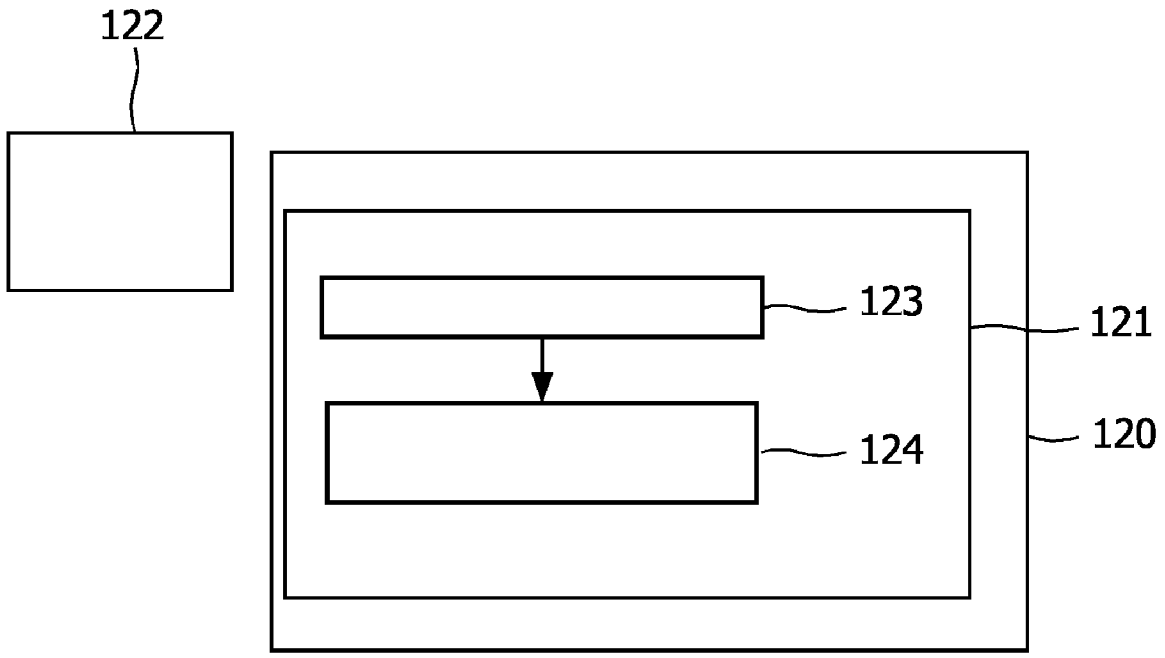
FIG. 12 is a schematic illustration of an embodiment of the computer readable medium comprising a computer executable program according to the present invention.

An embodiment of the computer-readable medium according to the invention is shown in FIG. 12. The computer-readable medium 120 has embodied thereon a computer program 121 for reducing electro-optical cross talk in a Spectrum Sequential Display, for processing by a computer 122, and the computer program comprises a code segment 124 for compensating said cross talk of said Spectrum Sequential Display previously measured, in such a manner that a desired light output (D1, D2) of said Spectrum Sequential Display is produced as close as possible. According to the embodiment, compensating cross talk in the display by means of code segment 124 is done by making use of an inverse to a cross talk of said display previously measured in a step 123, e.g. by means of the above described measurement method. More precisely, code segment 124 alters a drive signal, in a video processing means, to a plurality of picture elements of a display panel in a LC display in dependence on parameters of spectra of a light source of said color LC display. An embodiment of such a LC display is described below.

According to embodiments of the color display device of the invention, such a display is provided, which compensates the cross talk with a video processing circuit. This circuit essentially replaces the display gamma correction and overdrive functionality of a regular LCD panel, and different embodiments for static or dynamic images are given below.

Figure 7:
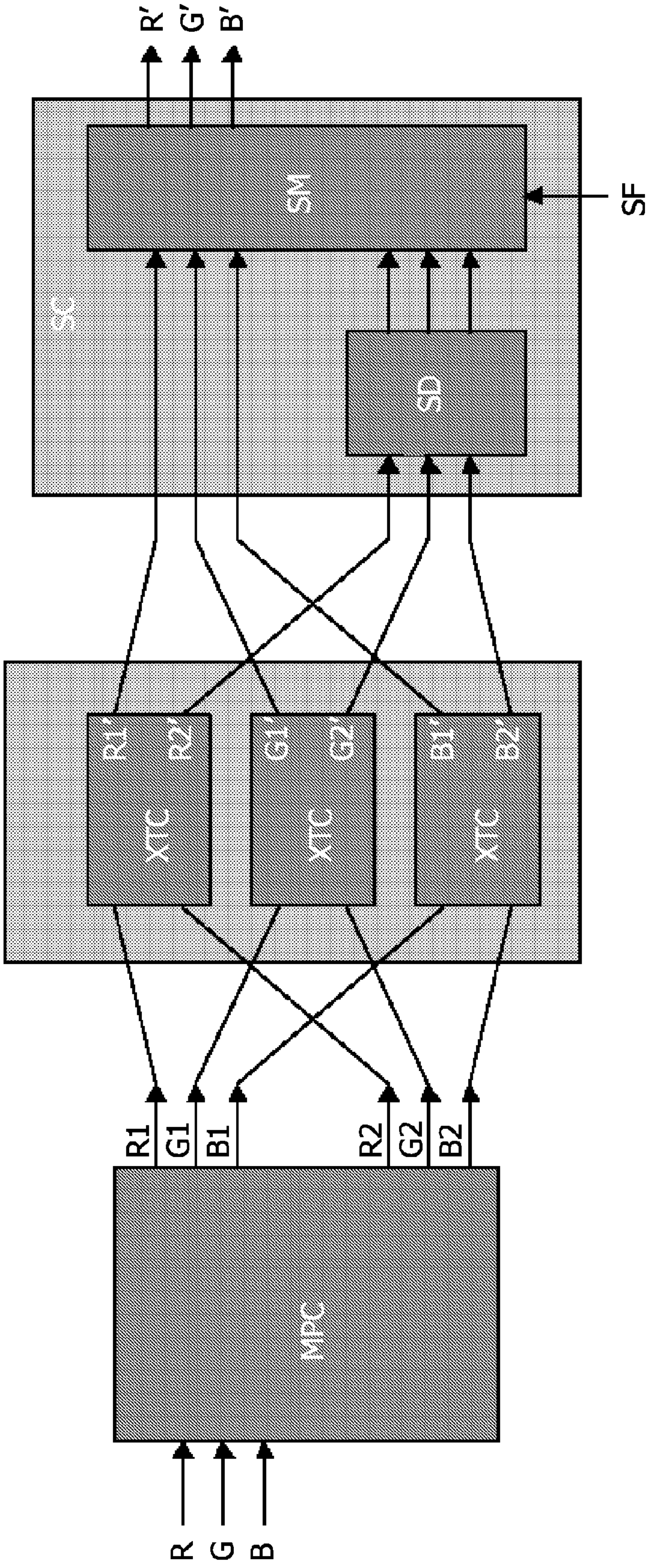
FIG. 7 is a schematic illustration showing a basic scheme for cross talk compensation according to an embodiment of the invention.

A first embodiment of a control circuit for a color display device is shown in FIG. 7. This embodiment works well for static images and is described hereinafter.

The input in this embodiment is a video signal having a wide gamut color space. A wide gamut RGB space may be used, but XYZ could be equally effective. This is converted to a 6-primary drive signal with a multi-primary conversion MPC, yielding the drive values R1 G1 B1 and R2 G2 B2 for the two sub frames. These drive values are processed pairwise, e.g. R1, R2, in a cross talk compensation circuit XTC yielding the preferred compensated drive values, e.g. R'1, R'2. These are then fed into a sub frame timing controller SC having a subframe multiplexer SM, via which the panel is first driven with the compensated drive values R'1 G'1 B'1 in the first sub frame, and then with R'2 G'2 B'2 in the second sub frame. The sub frame timing controller SC further contains a sub frame delay element SD to store the drive values for the second sub frame until it is sequenced, via the sub frame multiplexer SM depending on a sub frame control signal SF. The output of the multiplexer SM is formed by the sequenced drive values R'G'B', which alternately comprise R'1 G'1 B'1 and R'2 G'2 B'2.

The central part of the cross talk correction circuit XTC comprises for every color channel RGB a correction circuit XTC. This circuit does an inverse mapping of the physical cross talk to derive the required, compensated, drive values, e.g. R'1, R'2 that would result, i.e. with cross talk in the display, in the (closest matching) desired light output that would correspond to the drive values, e.g. R1, R2, in a cross-talk free display. The circuit is for instance implemented as a 2 dimensional, also called 2D, Look Up Table, also called LUT, as is common practice in LCD Overdrive circuitry. The major difference is that there are two outputs, i.e. one per sub frame. The number of LUTs is governed by the number of color channels or differently colored subpixels; in this case it is three for RGB.

Alternatively, this embodiment may be optionally modified as follows:

1. For the cross talk circuit, a 2D interpolating LUT is used, as is known from LCD Overdrive circuitry;
2. The contents of the LUT differs per individual RR GG BB channels, taking into account the differing phosphor decay times;
3. The contents of the LUT takes into account the cross talk due to the lamp scanning operation, wherein this is obtained by measurement, as mentioned above; and/or
4. LC response is improved.

The above described embodiment in FIG. 7 is well suited for static images, i.e. R1 R2 do not change over a relatively long time, and shows still a remarkable performance for moving images. Nevertheless, two alternative embodiments are provided, which are designed for dynamic images. These alternative embodiments, which are well suited for dynamic images will now be described in more detail with reference to FIGS. 8-10.

Figure 8:
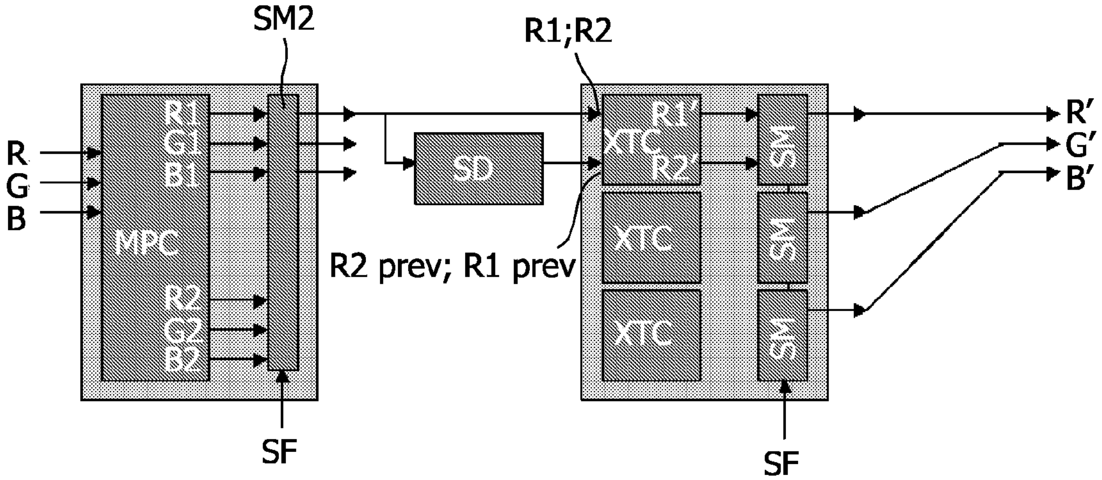
FIG. 8 is a schematic illustration of a first embodiment of the invention implemented for dynamic images.

The overall design is shown in FIG. 8, wherein only the red channel is shown in detail. The multi-primary conversion MPC now produces drive values per subframe by selecting via a second sub frame multiplexer SM2 the appropriate sequence of drive values R1 G1 B1 and R2 G2 B2 under control of the subframe control signal SF.

The output of the MPC is then fed to the cross talk correction circuit XTC, and to a sub frame delay storage SD, which stores the drive value of a previous sub frame. The cross talk correction XTC then calculates the required, compensated drive values, wherein the appropriate sequence is selected by the sub frame multiplexer SM.

Figure 9:
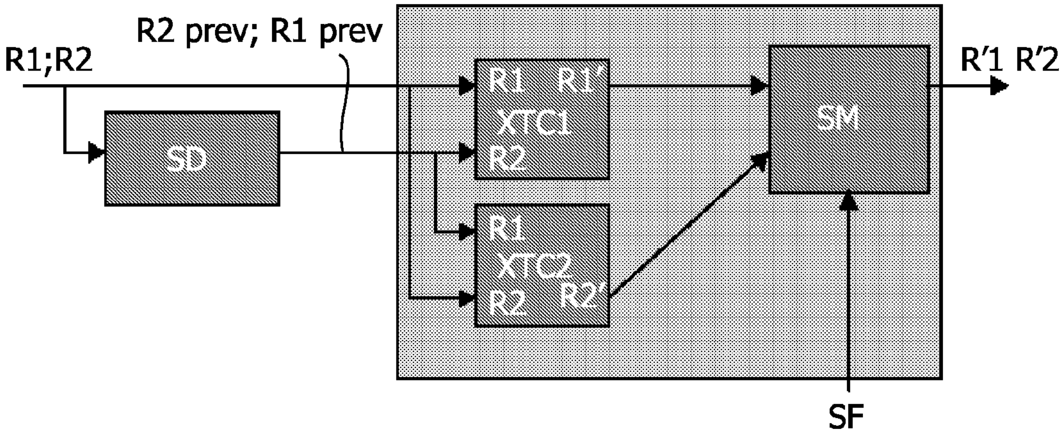
FIG. 9 is a schematic illustration of the embodiment of FIG. 8 in more detail.

The cross talk specific part of FIG. 8 is shown in greater detail in FIG. 9. In sequence, R1 is offered to the circuit in the first sub frame, followed by R2 in the second sub frame. These drive values are also stored in the sub frame delay SD, which delays these drive values by exactly one sub frame time. In the first sub frame, this delay delivers the drive value of the previous 2nd sub frame: R2prev. This value R2prev is then combined with R1 to calculate the required drive value R'1 as illustrated with block XTC1 in FIG. 9. In the second sub frame, the subframe delay SD delivers the delayed drive value R1, being R1prev which is then combined with the incoming drive value R2 to calculate the required drive value R'2, as illustrated with block XTC2 in FIG. 9. The subframe multiplexer SM selects the sequence of required drive values R'1, R'2 under control of the subframe control signal SF.

This circuitry is identical to known LCD Overdrive circuitry, with the major difference of a subframe-switchable LUT.

Figure 10:
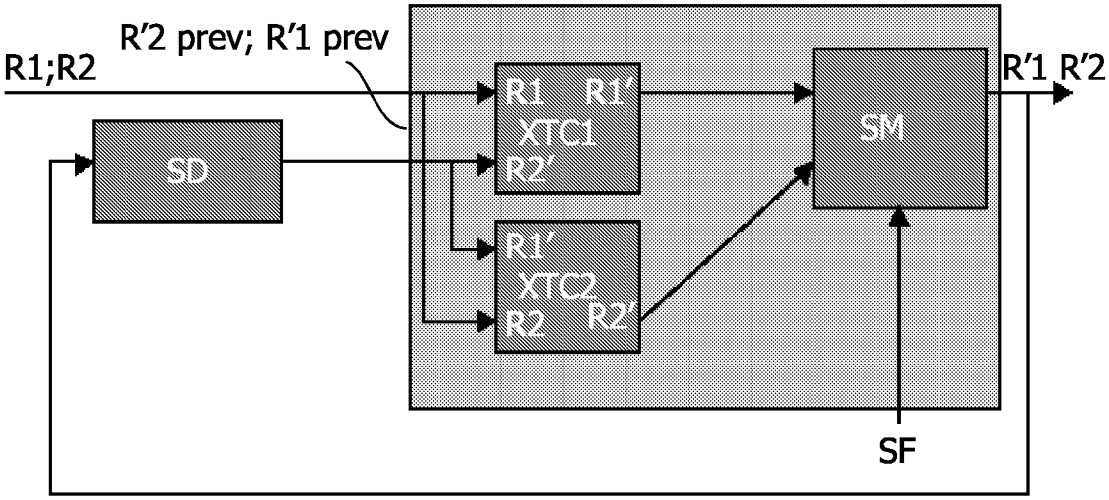
FIG. 10 is a schematic illustration of a second embodiment implemented for dynamic images.

For overdrive circuitry, a second embodiment exists, which is known as "feedback overdrive", where a new overdrive value is determined on basis of the actually achieved final value during the preceding frame. This may also be applied to the cross talk compensation, as shown in FIG. 10. The difference with respect to FIG. 9 is that the subframe delay SD now receives the actual output values R'1prev and R'2 instead of the values R1; R2, resulting after the delay of one subframe in the values R'1 and R'2 prev.

The advantage of this technique is the elimination of annoying artifacts, by compensating for the electro-optical cross talk in a spectrum sequential display. Alternative techniques to eliminate this cross talk place a heavy burden on the display system in addressing, response and lamp efficiency. The cross talk compensation circuitry is an improvement of existing LCD Overdrive circuitry, and is implementable at little extra cost.

Applications and use of the above described method and device according to the present invention are various and include exemplary fields such as a consumer LCD-TV and LCD-monitors. The Spectrum Sequential approach allows for a much wider color gamut, direct view LCD-TV, at a small cost in brightness or power consumption. This cost in brightness/power consumption is very small (about 90% brightness for 150% gamut) when compared to alternative techniques, such as dedicated wide gamut phosphors for fluorescent lamps, or wide gamut LED backlights.

The invention may be implemented in any suitable form including hardware, software, firmware or any combination of these. The invention is for instance implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different light sources than those described above.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A color display device for displaying a color image, the color display device comprising:

a display panel provided with a plurality of picture elements for displaying said color image, wherein each of said picture elements is controllable by a drive signal (R',G',B');

a light source capable of providing to said plurality of picture elements a first spectrum during a first period (SF1) and a second spectrum (S2), different from the first spectrum, during a second period (SF2); and a video processing means (MPC, XTC, SC; MPC, SM2, SD, XTC, SM) for processing information (RGB) representing said color image, wherein said video processing means is configured to provide said drive signal (R',G',B') from said information (RGB) to said plurality of picture elements, said drive signal comprising a first set of primary drive signals (R1,G1,B1) for driving said plurality of picture elements during said first period (SF1) using said first spectrum (S1) and comprising a second set of primary drive signals (R2,G2,B2) for driving said plurality of picture elements during said second period (SF2) using said second spectrum (S2), the video processing means comprising:

a means (XTC) for reducing an electro-optical cross talk effect between sub-frames of said color image displayed on said display panel in said color display device caused by (i) a temporal electro-optical response of said display panel and (ii) a temporal profile of said light source, wherein said means (XTC) for reducing said electro-optical cross talk effect is configured for altering said drive signal (R',G',B') to each of said plurality of picture elements in dependence on parameters of different spectra of said light source to compensate for said electro-optical cross talk.

2. The color display device according to claim 1, wherein the parameters of the different spectra of said light source comprise a temporal profile of said light source.

3. The color display device according to claim 2, wherein the temporal profile of said light source comprises a phosphor decay time of the individual phosphors used in the light source, a spatio-temporal optical cross talk in a backlight if operated in lamp scanning mode, or specific lamp timing, relative to display panel addressing.

4. The color display device according to claim 1, wherein said means (XTC) for reducing said electro-optical cross talk effect alter said drive signal (R',G',B') during the first period in dependence on one or more the properties related to the first spectrum and during the second period in dependence on one or more properties related to the second spectrum.

5. The color display device according to claim 1, wherein the means (XTC) for reducing said electro-optical cross talk effect comprises a two-dimensional Look Up Table for altering said drive signal, the two-dimensional Look Up Table providing two outputs, one per sub-frame (SF1, SF2).

6. The color display device according to claim 5, wherein the content of the two-dimensional Look Up Table differs per individual color channel.

7. The color display device according to claim 5, wherein the two-dimensional Look Up Table comprises an inverse mapping of a measured physical cross talk.

8. The color display device according to claim 1, wherein said means (XTC) for reducing said electro-optical cross talk effect in use by said color display device alter said drive signal (R',G',B') in such a way so as to substantially obtain from a picture element an average brightness over the first and second period proportional to an average brightness of corresponding information of the color image.

9. The color display device according to claim 1, wherein said means (XTC) for reducing said electro-optical cross talk effect in use by said color display device alter said drive signal in such a way so as to substantially obtain from a picture element an average color saturation over the first and second period proportional to an average color saturation of corresponding information of the color image.

10. The color display device according to claim 1, wherein said means (XTC) for reducing said electro-optical cross talk effect of said color display device is further for reducing said electro-optical cross talk effect for each of a color channel of said color display device.

11. The color display device according to claim 10, wherein said means (XTC) for reducing said electro-optical cross talk effect for one of said color channels of said color display device computes a first and a second value for said altered drive signal for said first and said second period, respectively, and wherein a delay means (SD) is arranged after said means for reducing said electro-optical cross talk effect so that said first and said second value for said altered drive signal are applied to said picture elements during said first and said second period, respectively.

12. The color display device according to claim 1, wherein the means (XTC) for reducing an electro-optical cross talk effect include a drive value of a previous second period for altering the drive value of the current first period, and wherein the means (XTC) for reducing an electro-optical cross talk effect include a drive value of the first period for altering the drive value of the second period.

13. The color display device according to claim 12, wherein the means (XTC) for reducing an electro-optical cross talk effect include an actual output drive value of a previous second period for altering the drive value of the current first period, and wherein the means (XTC) for reducing an electro-optical cross talk effect include an actual output drive value of the first period for altering the drive value of the second period.

14. The color display device according to claim 1, wherein said drive signal (R',G',B') controls the light transmittance of said picture elements during said first and second period.

15. A method of reducing the effect of an electro-optical cross talk effect in a color display device according to claim 1, said method comprising:

altering a drive signal (R',G',B'), in a video processing means, to a plurality of picture elements in dependence on parameters of different spectra of said light source of said color display device to compensate for said electro-optical cross talk.

16. A signal for reducing the effect of an electro-optical cross talk effect in a color display device according to claim 1, for displaying a color image, wherein said signal is an altered drive signal, in a video processing means, to a plurality of picture elements in dependence on parameters of spectra of a light source of said color display device.

17. A circuit for driving a display panel of a color display device for displaying a color image, the display panel including a plurality of picture elements for displaying said color image, wherein each of said picture elements is controllable by a drive signal (R',G',B') from said circuit, said circuit comprising:

a video processing means (MPC, XTC, SC; MPC, SM2, SD, XTC, SM) for processing information representing said color image, wherein said video processing means is configured to provide said drive signal (R',G',B') from said information (RGB) to said plurality of picture elements, said drive signal comprising a first set of primary drive signals (R1,G1,B1) for driving said plurality of picture elements during a first period (SF1) using a first spectrum (S1) and comprising a second set of primary drive signals (R2,G2,B2) for driving said plurality of picture elements during a second period (SF2) using a second spectrum (S2); and at least one means (XTC) for reducing an effect of an electro-optical cross talk effect between sub-frames of said color image displayed on said display panel caused by (i) a temporal electro-optical response of said display panel and (ii) a temporal profile of a light source of said display panel, wherein said means (XTC) for reducing said electro-optical cross talk effect is configured for altering said drive signal (R',G',B'), in said video processing means, to said plurality of picture elements in dependence on parameters of different spectra from said light source of said display panel capable of providing said first (S1) spectrum and said second (S2) spectrum, different from the first spectrum, to compensate for said electro-optical cross talk, wherein said light source is capable of selectively providing light of said first or second spectrum to said plurality of picture elements, and wherein a control means provides to said plurality of picture elements alternately one of said different spectra during said first and said second period, respectively.

18. A non-transitory computer-readable medium having embodied thereon a computer program for reducing the effect of an electro-optical cross talk effect in a color display device, for displaying a color image, the computer program for processing by a computer, the computer program comprising:

a code segment for altering a drive signal, in a video processing means, to a plurality of picture elements for reducing an electro-optical cross talk effect between sub-frames of said color image displayed on a display panel of said color display device caused by (i) a temporal electro-optical response of said display panel and (ii) a temporal profile of a light source of said color display device in dependence on parameters of different spectra of said light source of said color display device to compensate for said electro-optical cross talk.

19. The non-transitory computer-readable medium according to claim 18 embodied with a computer program for processing by a computer for enabling carrying out of a method of reducing the effect of an electro-optical cross talk effect in a color display device for displaying a color image, wherein the color display device comprises:

a display panel provided with a plurality of picture elements for displaying said color image, wherein each of said picture elements is controllable by a drive signal (R',G',B');

a light source capable of providing to said plurality of picture elements a first spectrum during a first period (SF1) and a second spectrum (S2), different from the first spectrum, during a second period (SF2); and a video processing means (MPC, XTC, SC; MPC, SM2, SD, XTC, SM) for processing information (RGB) representing said color image, wherein said video processing means is configured to provide said drive signal (R',G',B') from said information (RGB) to said plurality of picture elements, said drive signal comprising a first set of primary drive signals (R1,G1,B1) for driving said plurality of picture elements during said first period (SF1) using said first spectrum (S1) and comprising a second set of primary drive signals (R2,G2,B2) for driving said plurality of picture elements during said second period (SF2) using said second spectrum (S2), wherein the video processing means further comprises:

a means (XTC) for reducing an electro-optical cross talk effect in said color display device, wherein said means (XTC) for reducing said electro-optical cross talk effect is configured for altering said drive signal (R',G',B') to each of said plurality of picture elements in dependence on parameters of spectra of said light source, said method further comprising:

altering a said drive signal (R',G',B'), in said video processing means, to said plurality of picture elements in dependence on parameters of different spectra of said light source of said color display device to compensate for said electro-optical cross talk.

* * * * *